United States Patent
Lee et al.

(10) Patent No.: US 9,876,774 B2
(45) Date of Patent: Jan. 23, 2018

(54) COMMUNICATION SECURITY SYSTEM AND METHOD

(71) Applicant: GOTRUST TECHNOLOGY INC., Taichung (TW)

(72) Inventors: Tien-Chi Lee, Taichung (TW); Jeng Lung Li, Taichung (TW); Yi-Hsiung Huang, Taichung (TW)

(73) Assignee: GOTRUST TECHNOLOGY INC., Taichung (TW)

( * ) Notice: Subject to any disclaimer, the term of this patent is extended or adjusted under 35 U.S.C. 154(b) by 357 days.

(21) Appl. No.: 14/616,012

(22) Filed: Feb. 6, 2015

(65) Prior Publication Data

US 2016/0057118 A1 Feb. 25, 2016

(30) Foreign Application Priority Data

Aug. 19, 2014 (TW) .............................. 103128511 A

(51) Int. Cl.
*H04L 29/06* (2006.01)
*H04L 9/08* (2006.01)
*H04W 12/02* (2009.01)
*H04W 12/04* (2009.01)

(52) U.S. Cl.
CPC .......... *H04L 63/061* (2013.01); *H04L 9/0816* (2013.01); *H04L 9/0861* (2013.01); *H04W 12/02* (2013.01); *H04W 12/04* (2013.01); *H04L 63/0435* (2013.01); *H04L 63/123* (2013.01)

(58) Field of Classification Search
CPC ... G06F 21/602; H04L 9/0816; H04L 9/0819; H04L 9/0825; H04L 9/0838; H04L 9/0841; H04L 9/0861
See application file for complete search history.

(56) References Cited

U.S. PATENT DOCUMENTS

2010/0008506 A1* 1/2010 Park ...................... H04L 9/3231
380/255
2011/0222688 A1* 9/2011 Graham .............. H04L 63/0428
380/247

* cited by examiner

*Primary Examiner* — Edward Zee
(74) *Attorney, Agent, or Firm* — Muncy, Geissler, Olds & Lowe, P.C.

(57) ABSTRACT

A communication security system includes a secure communication application module and a chip module. The communication security system is installed in a mobile device. Accordingly, the communication security system of the present invention allows mobile devices of users to encrypt and decrypt communication data between the users. A communication security method includes the steps of generating keys, requesting a key exchange by a first mobile device, receiving a key exchange by a second mobile device, receiving a key exchange by the first mobile device, activating a key by the second mobile device, activating a key by the first mobile device, and starting secure communication between the first and second devices. Thus, the encrypted communication can avoid theft and unauthorized falsification.

5 Claims, 21 Drawing Sheets

COMMUNICATION SECURITY SYSTEM AND METHOD

BACKGROUND OF THE INVENTION

1. Field of the Invention

The present invention generally relates to electronic communications, and more specifically to communication security system and method applied to mobile 2. Description of the Related Art devices.

Nowadays, as the communication technology has made a great progress, mobile devices have become rapidly developed. Modern people are increasingly dependent on the mobile devices and the Internet since smart phones associated with the Internet and mobile telecommunication technology have been developed successfully. In addition, the mobile devices have been widely applied to various aspects (e.g. communication, work, and business) of daily lives of people.

When a mobile device is operated, voice and message communications are frequently used. For example, a user may communicate with other users or transmit some confidential information by means of a mobile device. However, some evil individuals or hackers may take advantage of hacking techniques, such as computer viruses (e.g. Trojan horse), communication network attacks, wiretapping, physical communication virus attacks, and so on, to get access to or monitor the confidential information of the users.

The conventional secure communication technology used in mobile devices is to make a security token like subscriber identity module (SIM) card, embedded chip, or microSD card serve as authentication and session key exchange. While the session key exchange is completed successfully, the session key will be transmitted to the operating system of a mobile device to perform encryption and decryption.

It may therefore be desirable for the present invention to provide a communication security system for a mobile device. The communication security system of the present can encrypt/decrypt communication between users so as to enable confidential information of users not to be accessed to, stolen, or tapped by evil individuals or hackers.

SUMMARY OF THE INVENTION

The primary objective of the present invention is to provide a communication security system which can solve the aforesaid communication security problems between mobile devices and encrypt communication to avoid theft and unauthorized falsification.

For achieving the foregoing objective, the communication security system includes a secure communication application module and a chip module. The secure communication application module has at least one application program interface (API) for providing the user with a user interface and for transmitting communication data. The chip module has a secure digital encryptor for performing key processing for the communication security system and for encrypting/decrypting the communication data. The secure communication application module can transmit the communication data to the chip module, and then the chip module can encrypt/decrypt the communication data and return the encrypted/decrypted communication data to the secure communication application module when the chip module receives the communication data.

Preferably, the API can convert a request for encryption/decryption of the communication data into a command of the chip module and then convert the command of the chip module into a protocol packet format.

Moreover, the communication security system of the present invention can further include a mobile device operating system having the secure communication application module and at least one API. The chip module is mounted to an encryption/decryption card, having a transmitting end which can encrypt the communication data having voice data and short messages by means of the encryption/decryption card and transmit the encrypted communication data having the voice data and short messages to the mobile device operating system; next, the encrypted communication data having the voice data and short messages are transmitted to a receiving end by the mobile device operating system and the receiving end decrypts the encrypted communication data by means of the encryption/decryption card.

Preferably, the API converts a request for encryption/decryption of the communication data to a command of the chip module and then converts the command of the chip module to a protocol packet format.

Preferably, the encryption/decryption card can further include a flash memory and a controller. The flash memory can store the communication data. The controller can control access to the flash memory of the chip module and transmit a command to the chip module.

In a preferred embodiment of the present invention, a communication security method includes the following steps of generating a first key from a first mobile device and generating a second key from a second mobile device; requesting a key exchange from the first mobile device; receiving a request of the key exchange by the second mobile device and informing the first mobile device that the key exchange have been received by the second mobile device; generating a session key from each of the first mobile device and the second mobile device; and starting communication between the first mobile device and second mobile device. Encryptions/decryptions of the first key, the second key, and the session key are performed in a first encryption/decryption card of the first mobile device and a second encryption/decryption card of the second mobile device, respectively.

Preferably, the aforesaid first step can further include the following sub-steps: signing in the first encryption/decryption card by means of a first secure communication application module from the first mobile device; and signing in the second encryption/decryption card by means of a second secure communication application module from the second mobile device.

Preferably, the aforesaid second step can further include the following sub-steps of calling the second mobile device from the first mobile device; transmitting the first key of the first mobile device to the second mobile device; receiving the first key and authenticating the first key by the second mobile device; transmitting the second key of the second mobile device to the first mobile device after the first key is authenticated by the second mobile device successfully; and receiving the second key and authenticating the second key by the first mobile device. When the first key is authenticated by the second mobile device successfully and the second key is authenticated by the first mobile device successfully, each of the first encryption/decryption card of the first mobile device and the second encryption/decryption card of the second mobile device generates the session key.

Preferably, the authentications of the first key and the second key are performed in the encryption/decryption cards of the first mobile device and the second mobile device, respectively.

Preferably, the present invention can further include the following sub-steps of transmitting the session key from the second mobile device to the first mobile device and activating the session key by the second mobile device; and receiving the session key by the first mobile device and authenticating whether the session key of the second mobile device is consistent with the session key of the first mobile device.

In addition, the aforesaid last step can further include the following sub-steps of transmitting the communication data and the session key from the first mobile device to the second mobile device; authenticating the session key by the second mobile device; and playing the communication data by the second mobile device when the session key is authenticated by the second mobile device successfully. The authentication of the session key is performed by the second encryption/decryption card of the second mobile device.

Preferably, the communication data are voice data or short messages.

BRIEF DESCRIPTION OF THE DRAWINGS

The present invention will be better understood according to the following detailed description of preferred exemplary embodiments and the attached drawings.

DETAILED DESCRIPTION OF THE PREFERRED EMBODIMENT

Figure 1:
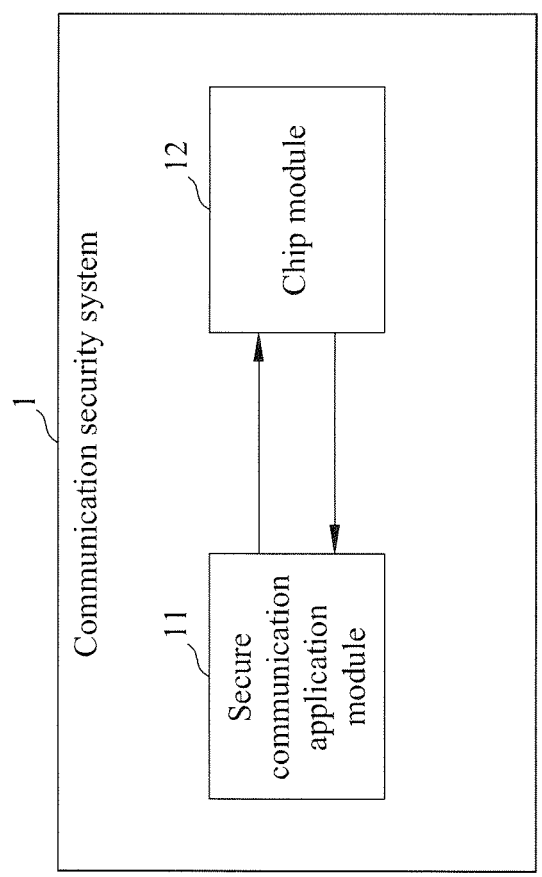
FIG. 1 is a block diagram illustrating a communication security system of the present invention.

Some definitions of technical terms used herein enable those skilled in the art to clearly understand the present invention. However, these technical terms are not limited to the present invention.

$VID_A$: Voice over Internet protocol identify code (VoIP ID) of a first mobile device.

$VID_B$: Voice over Internet protocol identify code (VoIP ID) of a second mobile device.

$K_A$: A pair of public and private keys ($PUK_A$, $PRK_A$) based on Rivest-Shamir-Adleman (RSA) asymmetric encryption algorithms of an encryption/decryption card of the first mobile device.

$K_B$: A pair of public and private keys ($PUK_B$, $PRK_B$) based on Rivest-Shamir-Adleman (RSA) asymmetric encryption algorithms of an encryption/decryption card of the second mobile device.

Calling Token (CT): A proprietary symbol carrying the RSA public key, session initiation protocol (SIP) ID, and a unique number indicative of the identity of a mobile device in the encryption/decryption card.

$CT_A$: The calling token of the encryption/decryption card of the first mobile device, including the signature of the public key $K_A$ of the encryption/decryption card of the first mobile device for allowing the other party to verify the correctness of the public key $K_A$ to prevent the public key of the encryption/decryption card from falsification.

$CT_B$: The calling token of the encryption/decryption card of the second mobile device, including the signature of the public key $K_A$ of the encryption/decryption card of the second mobile device to allow the other party to verify the correctness of the public key $K_B$ to prevent the public key of the encryption/decryption card from falsification.

$Y_A$: A session key exchange parameter generated by the encryption/decryption card of the first mobile device; it is the parameter figured out and generated based on the well-known key exchange algorithm, namely Diffie-Hellman Key Exchange, and it can be replaced by other similar algorithms in the future.

$Y_B$: A session key exchange parameter generated by the encryption/decryption card of the second mobile device; it is the parameter figured out and generated based on the well-known key exchange algorithm, namely Diffie-Hellman Key Exchange, and it can be replaced by other similar algorithms in the future.

$E_{AB}$: Data generated by the encryption/decryption card of the second mobile device after the session key exchange parameter $Y_B$ is encrypted by the public key $K_A$.

$E_{BA}$: Data generated by the encryption/decryption card of the first mobile device after the session key exchange parameter $Y_A$ is encrypted by the public key $K_B$.

$S_B$: Data generated by the encryption/decryption card of the second mobile device after the session key exchange parameter $Y_B$ is signed by the private key $K_B$; the encryption/decryption card of the first mobile device can check the integrity of the session key exchange parameter $Y_B$ via the public key $K_B$ to ensure that the session key exchange parameter $Y_B$ is not falsified.

$K_{ses}$: A session key figured out by the Diffie-Hellman Key Exchange algorithm; the follow-up voice data are encrypted/decrypted by this key.

$T_A$: Message authentication code (MAC) value of the session key $K_{ses}$, figured out by the encryption/decryption card of the first mobile device to allow the other party to determine whether the keys generated by both parties are consistent with each other.

$T_B$: Message authentication code (MAC) value of the session key $K_{ses}$ figured out by the encryption/decryption card of the second mobile device to allow the other party to determine whether the keys generated by both parties are consistent with each other.

The accompanying drawings are included to provide a further understanding of the invention, and are incorporated in and constitute a part of this specification. The drawings illustrate exemplary embodiments of the invention and, together with the description, serve to explain the principles of the invention.

With regard to FIGS. 1-24, the drawings showing exemplary embodiments are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation.

In light of the foregoing drawings, an objective of the present invention is to provide a communication security system. Referring to FIG. 1, the communication security system 1 includes at least one secure communication application module 11 and a chip module 12. The secure communication application module 11 and the chip module 12 are both installed in a mobile device (not shown). The secure communication application module 11 can transmit the data (not shown) to be transmitted/received by the mobile device (not shown) to the chip module 12. After the chip module 12 receives the data to be transmitted/received by the mobile device, the chip module 12 can encrypt/decrypt the data and send the encrypted/decrypted data back to the secure communication application module 11 without disclosure to others.

Figure 2:
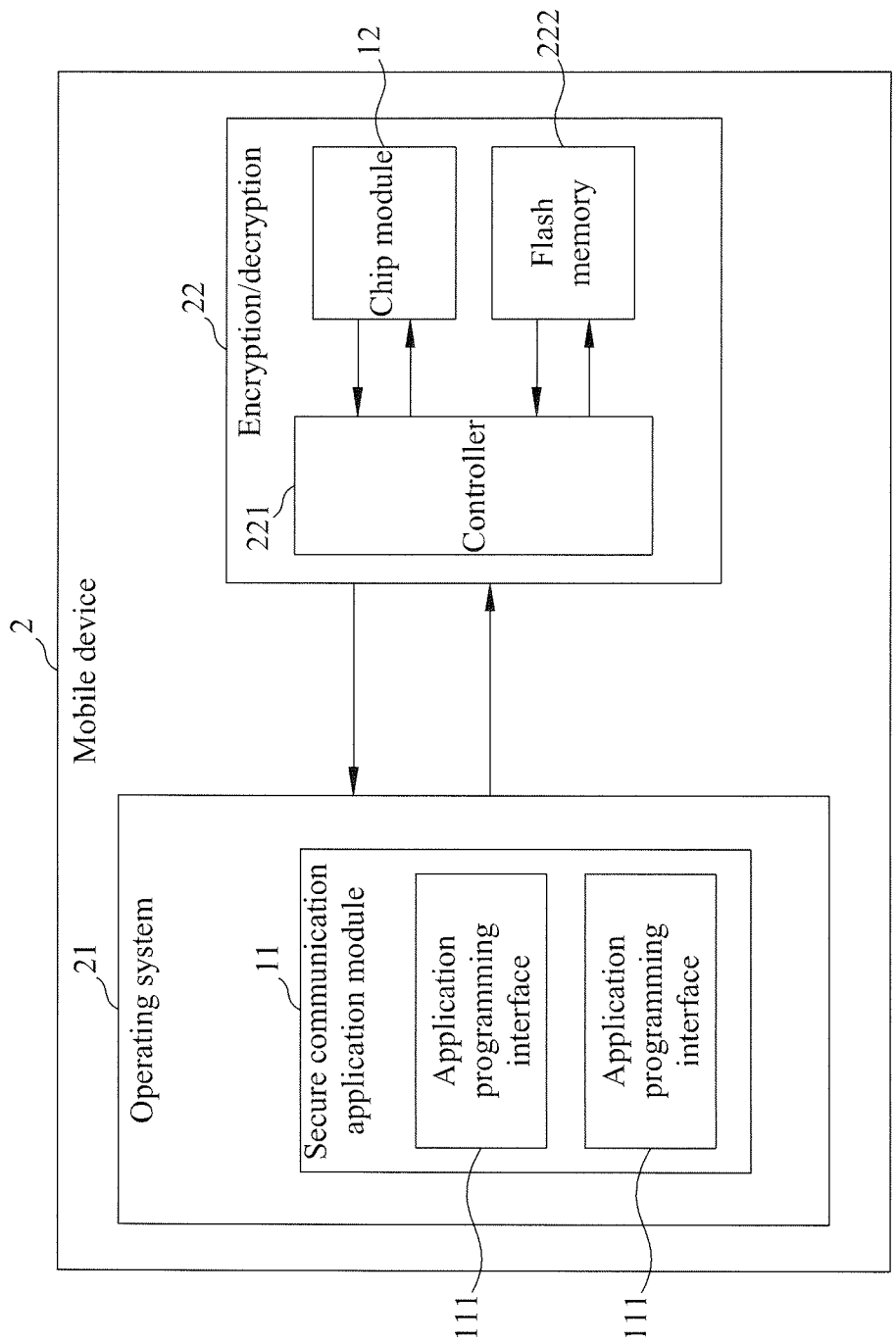
FIG. 2 is another block diagram illustrating a mobile device having the communication security system of the present invention.

Referring to FIG. 2, the mobile device 2 includes at least one operating system 21 and an encryption/decryption card 22. The operating system 21 includes a secure communication application module 11. The secure communication application module 11 includes at least one application programming interface (API) 111. The at least one API 111 can provide a user interface (not shown) for the secure communication application module 11 and can convert a request for encryption/decryption of voice data and short messages into a command of the chip module 12 at the same time. Furthermore, the at least one API 111 can convert the command of the chip module 12 into a protocol packet format. The encryption/decryption card 22 can at least include a controller 221, a chip module 12, and a flash memory 222. The controller 221 can be connected with the chip module 12 and the flash memory 222. The controller 221 can control the access to the flash memory 222. The chip module 12 of the encryption/decryption card 22 and the operating system 21 in the secure communication application module 11 can transmit and receive the data to and from each other and encrypt and decrypt the data via the at least one API 111.

Figure 3:
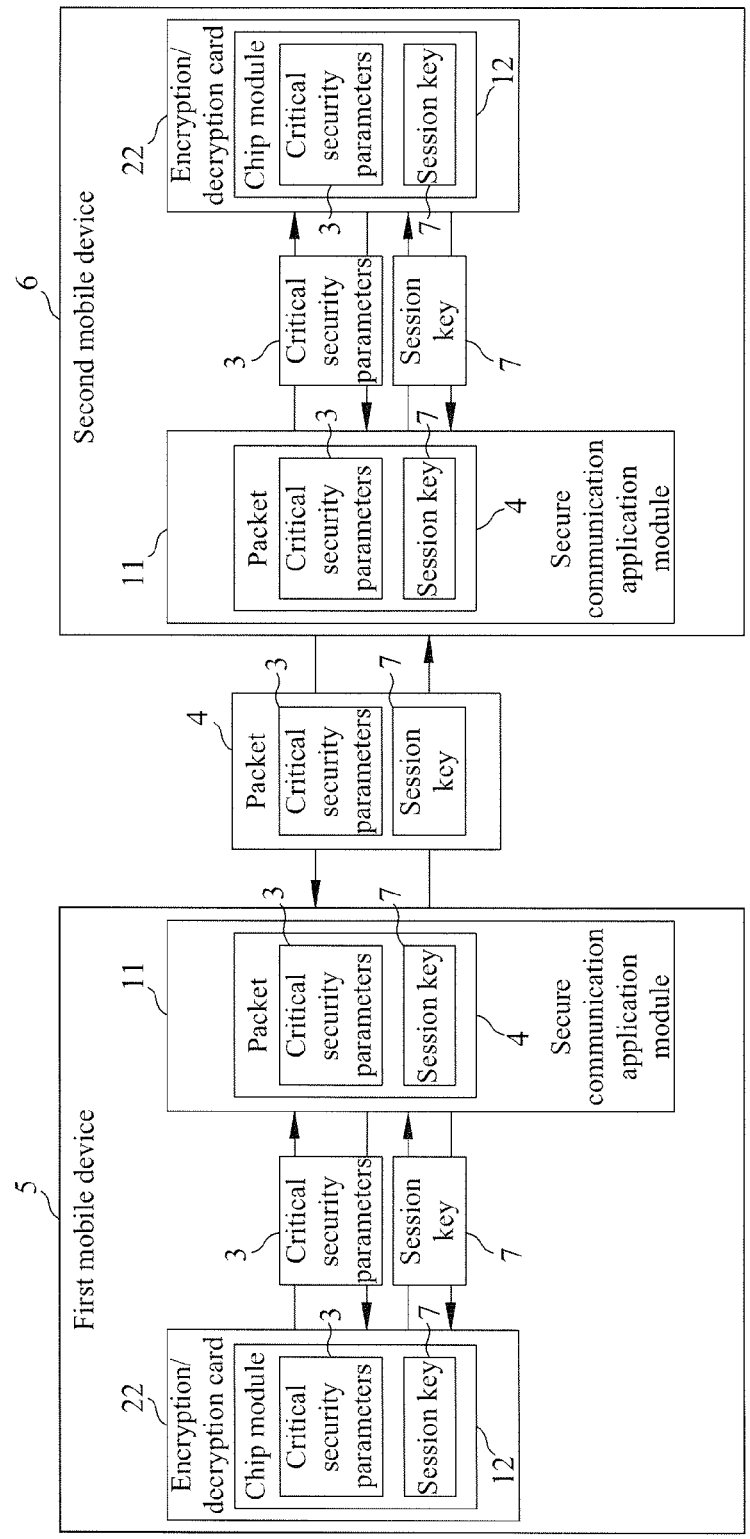
FIG. 3 is another block diagram illustrating communication between mobile devices by means of critical security parameters and packets according to the present invention.

Referring to FIG. 3, the chip modules 12 of the encryption/decryption cards 22 of the first mobile device 5 and the second mobile device 6 can generate at least one set of critical security parameters (CSP) 3 each for encryption when secure communication takes place between both communication parties. The CSPs 3 are variable according to communication protocols to be private and public keys, calling tokens, or session key exchange parameters. After that, the CSP 3 can be transmitted to one of the secure communication application modules 11 through the encryption/decryption cards 22. Next, the secure communication application modules 11 can generate at least one packet 4 containing the CSP 3. Moreover, the both communication parties can transmit at least one packet 4 containing the CSP 3 between the first mobile device 5 and the second mobile device 6 through the secure communication application modules 11 of the first mobile device 5 and the second mobile device 6 during the communication. Each of the secure communication application modules 11 can transmit the CSP 3 of the packet 4 to the encryption/decryption card 22 for decryption when the secure communication application modules 11 of both communication parties receive the packet 4 containing the CSP 3, respectively. The purpose of encryption/decryption of the communication data can be achieved after a series of transmissions of the CSPs 3 and the packet 4 between both communication parties. In the following preferred embodiments, the secure communication application module 11 can be an application program (App). The first mobile device 5 and the second mobile device 6 can perform point-to-point secure communication by means of the secure communication application modules 11 and the encryption/decryption cards 22. In other words, the communication date like the voice data and short messages are encrypted at a transmitting end and decrypted at a receiving end. In this way, only the interested personnel can receive the confidential voice data and short messages.

Figure 4:
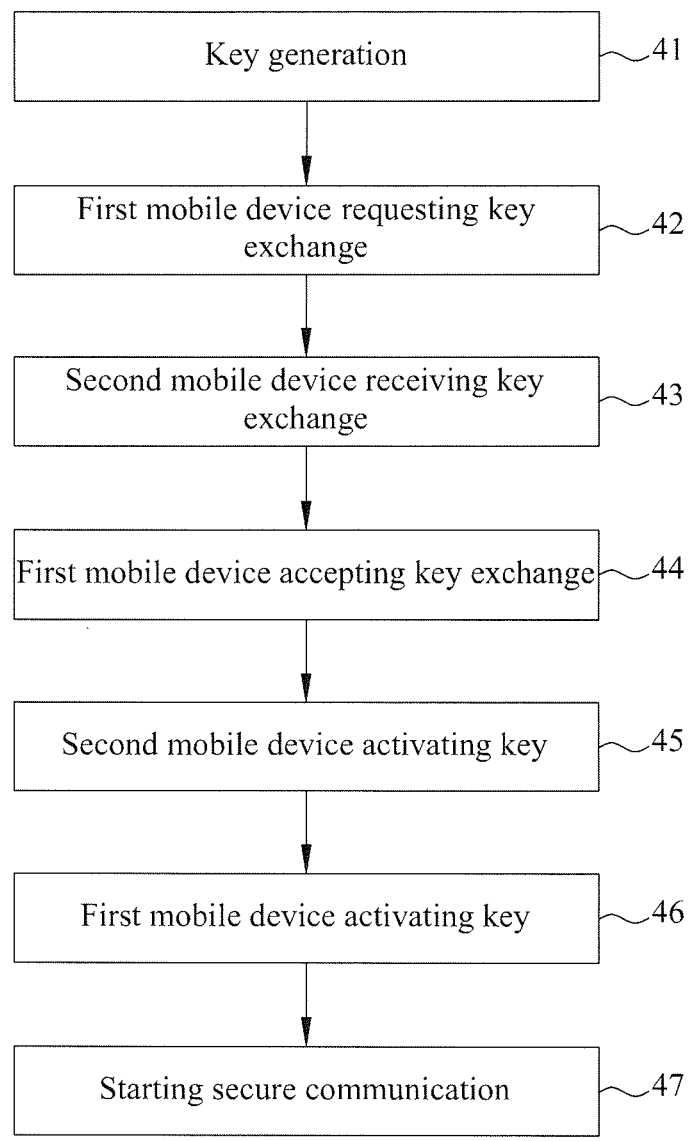
FIG. 4 is a flowchart illustrating a communication security method according to a first preferred embodiment of present invention.

Referring to FIG. 4, the secure communication method of the present invention includes the first step 41 of generating keys, the second step 42 of requesting a key exchange by a first mobile device, the third step 43 of receiving a key exchange by a second mobile device, the fourth step 44 of receiving a key exchange by the first mobile device, the fifth step 45 of activating a key by the second mobile device, the sixth step 46 of activating a key by the first mobile device, and the seventh step of starting secure communication.

Referring to FIG. 3 and FIG. 4, in the first step 41, the encryption/decryption cards 22 of the first mobile device 5 and the second mobile device 6 can jointly generate a pair of CSPs $3_A$, $3_B$ representing the first mobile device 5 and the second mobile device 6, respectively. In the meantime, the CSPs $3_A$, $3_B$ can be public keys.

In the second step 42, the secure communication application module 11 of the first mobile device 5 can generate the packet 4 containing the CSP $3_A$' representing the first mobile device 5 and transmit the packet 4 to the second mobile device 6. In the meantime, the CSP $3_A$' can be a CT.

In the third step 43, the secure communication application module 11 of the second mobile device 6 receives and analyzes the packet 4 indicated in the second step 42 to get the CSP $3_A$' representing the first mobile device 5. After that, the secure communication application module 11 of the second mobile device 6 can transmit the CSP $3_A$' representing the first mobile device 5 to the encryption/decryption card 22 of the second mobile device 6 and authenticate the CSP $3_A$' representing the first mobile device 5. After the authentication is correct, the secure communication application module 11 of the second mobile device 6 can generate the packet 4 containing the CSP $3_B$' representing the second mobile device 6 and transmit the packet 4 to the first mobile device 5.

In the fourth step 44, the secure communication application module 11 of the first mobile device 5 receives and analyzes the packet 4 indicated in the third step 43 to get the CSP $3_B$' representing the second mobile device 6. After that, the secure communication application module 11 of the first mobile device 5 can transmit the CSP $3_B$' representing the second mobile device 6 to the encryption/decryption card 22 of the first mobile device 5 and authenticate the CSP $3_B$' representing the second mobile device 6. After the authentication is correct, the encryption/decryption card 22 of the first mobile device 5 can generate a CSP $3_A$" and the secure communication application module 11 of the first mobile device 5 can generate the packet 4 containing the CSP $3_A$" and transmit the packet 4 to the second mobile device 6. In the meantime, the CSP $3_A$" can be a key exchange security parameter.

In the fifth step 45, the secure communication application module 11 of the second mobile device 6 receives and analyzes the packet 4 indicated in the fourth step 44 to get CSP $3_A$". After that, the secure communication application module 11 of the second mobile device 6 can transmit the CSP $3_A$" to the encryption/decryption card 22 of the second mobile device 6 and authenticate the CSP $3_A$". After the authentication is correct, the encryption/decryption card 22 of the second mobile device 6 can activate the CSP $3_A$" to generate a CSP $3_B$". Finally, the secure communication application module 11 of the second mobile device 6 can generate the packet 4 including the CSP $3_B$" and transmit the packet 4 to the first mobile device 5.

In the sixth step 46, the secure communication application module 11 of the first mobile device 5 receives and analyzes the packet 4 indicated in the fifth step 45 to get the CSP $3_B$". After that, the first mobile device 5 can use the encryption/decryption card 22 of the first mobile device 5 to authenticate the CSP $3_B$". After the authentication is correct, the encryption/decryption card 22 of the first mobile device 5 can activate the CSP $3_B$". After the first mobile device 5 and the second mobile device 6 activate the CSP $3_A$" and CSP $3_B$", respectively, the encryption/decryption cards 22 of the first mobile device 5 and the second mobile device 6 can jointly generate a session key 7 based on the CSP $3_A$" and CSP $3_B$". Secure communication between the two communication parties can be started after the session key 7 is generated.

In the seventh step 47, the secure communication application module 11 of the first mobile device 5 can obtain voice data (not shown) transmitted from the first mobile device 5. After that, the first mobile device 5 can use the encryption/decryption card 22 of the first mobile device 5 to encrypt the voice data via the session key 7. Next, the secure communication application module 11 of the first mobile device 5 can generate the packet 4 containing the session key 7 and the voice data and transmit the packet 4 to the second mobile device 6. The second mobile device 6 can use the session key 7 of the encryption/decryption card 22 of the second mobile device 6 to decrypt the voice data when the second mobile device 6 receives the packet 4. The second mobile device 6 can play the voice data transmitted from the first mobile device 5 after the encryption/decryption card 22 of the second mobile device 6 completes decryption.

Figure 5:
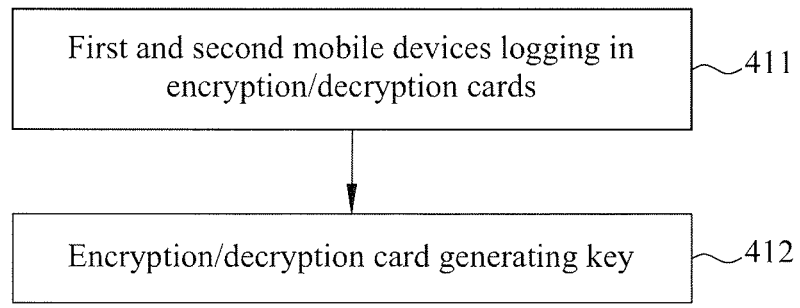
FIG. 5 is a flowchart illustrating the steps of generating keys according to the first preferred embodiment of present invention.

The detailed procedures of every step of the first preferred embodiment will now be described hereinafter. Referring to FIG. 5, the first step 41 includes procedures 411-412. In the procedure 411, before the first mobile device 5 and the second mobile device 6 carry out voice encryption for the first time, the first mobile device 5 and the second mobile device 6 have to sign in the encryption/decryption cards 22 via the secure communication application modules 11, respectively. In the procedure 412, after the first mobile device 5 and the second mobile device 6 sign in the encryption/decryption cards 22 via the secure communication application modules 11, each of the first mobile device 5 and the second mobile device 6 can generate a pair of RSA keys via the encryption/decryption cards 22 installed in the first mobile device 5 and the second mobile device 6, respectively. The CSP $3_A$ generated by the first mobile device 5 includes the public key $PUK_A$ and the private key $PRK_A$. The CSP $3_B$ generated by the second mobile device 6 includes the public key $PUK_B$ and the private key $PRK_B$. These two pairs of the keys will not be exposed externally. After the first step 41, the first mobile device 5 and the second mobile device 6 can perform the second step 42.

Figure 6:
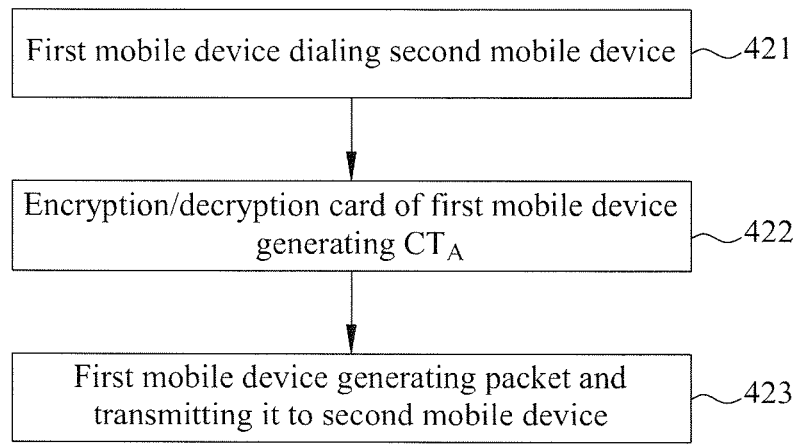
FIG. 6 is a flowchart illustrating the steps of requesting a key exchange from the first mobile device according to the first preferred embodiment of present invention.

Referring to FIG. 6, the second step 42 includes procedures 421-423. In the procedure 421, the first mobile device 5 dials the second mobile device 6 via the secure communication application module 11 of the first mobile device 5. When the first mobile device 5 dials the second mobile device 6, the first mobile device 5 also activates the VoIP ID of the second mobile device 6. In the procedure 422, the encryption/decryption card 22 of the first mobile device 5 generates a calling token $CT_A$. In the procedure 423, the secure communication application module 11 of the first mobile device 5 generates an invitation packet 4 containing $VID_B$, $VID_A$, $CT_A$, and $PUK_A$ and then transmit the invitation packet 4 to the second mobile device 6 through a secret server (not shown).

Figure 7:
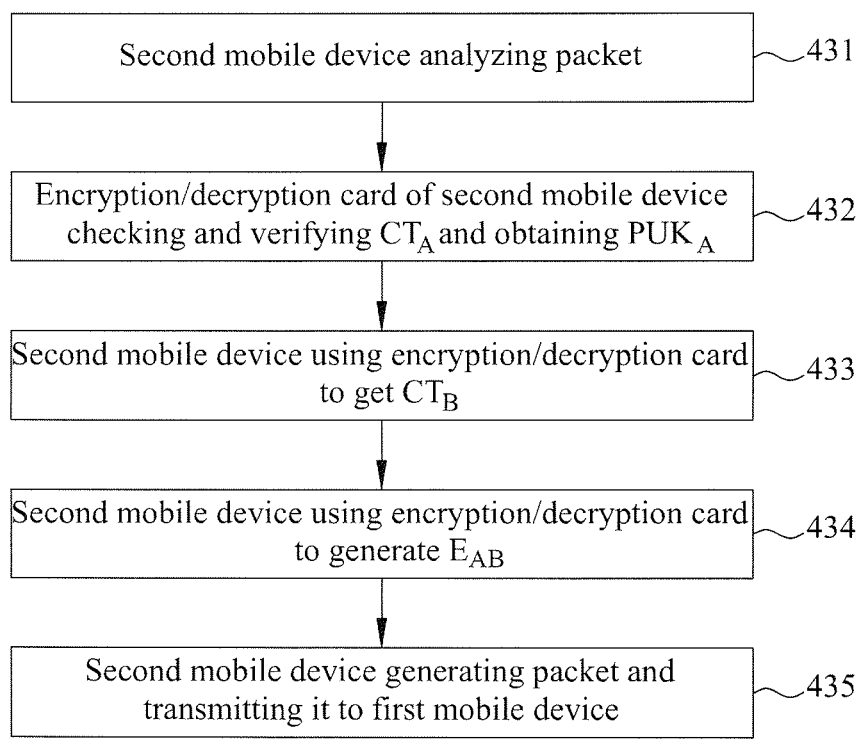
FIG. 7 is a flowchart illustrating the steps of receiving the request for the key exchange by the second mobile device according to the first preferred embodiment of present invention.

Referring to FIG. 7, the third step 43 includes procedures 431-435. In the procedure 431, the secure communication application module 11 of the second mobile device 6 analyzes the invitation packet 4 indicated in the procedure 424. In the procedure 432, the encryption/decryption card 22 of the second mobile device 6 checks and verifies the calling token $CT_A$. If the authentication is correct, the encryption/decryption card 22 of the second mobile device 6 can obtain the $PUK_A$ from the invitation packet 4. In the procedure 433, the second mobile device 6 uses the encryption/decryption card 22 to get the calling token $CT_B$ and then transmit it to the secure communication application module 11 of the second mobile device 6. In the procedure 434, the second mobile device 6 uses the encryption/decryption card 22 to generate the data $E_{AB}$. In the procedure 435, the secure communication application module 11 of the second mobile device 6 generates the packet 4 containing $E_{AB}$, $CT_B$, $VID_A$, $VID_B$, $PUK_B$ and then transmits the packet 4 to the first mobile device 5 through a secret server (not shown).

Figure 8:
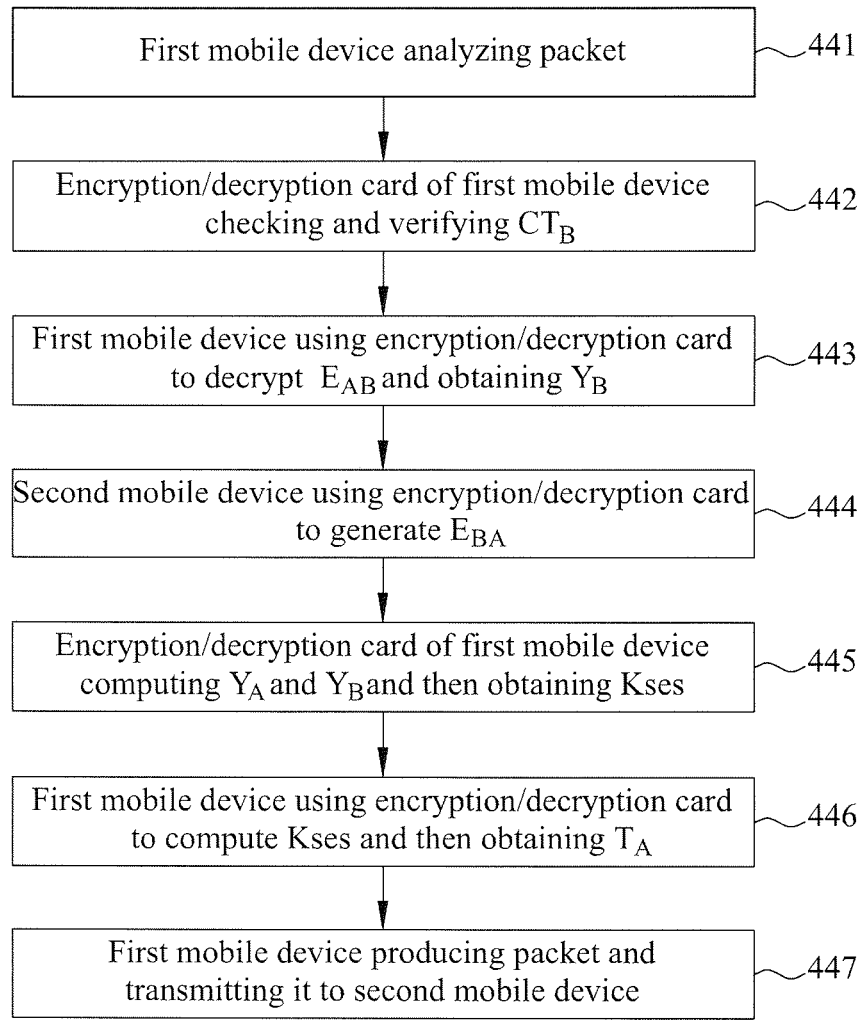
FIG. 8 is a flowchart illustrating the steps of receiving the request for the key exchange by the first mobile device according to the first preferred embodiment of present invention.

Referring to FIG. 8, the first mobile device receiving the key exchange step 44 includes procedures 441-447. In the procedure 441, the secure communication application module 11 of the first mobile device 5 analyzes the invitation packet 4 indicated in the procedure 435. In the procedure 442, the first mobile device 5 uses the encryption/decryption card 22 thereof to check and verify the calling token $CT_B$. Enter the procedure 443 if the authentication is correct. In the procedure 443, the encryption/decryption card 22 of the first mobile device 5 decrypts the data $E_{AB}$ and gets the session key exchange parameter $Y_B$ by using the private key $PRK_A$. In the procedure 444, the encryption/decryption card 22 of the first mobile device 5 generates the data $E_{BA}$. In the procedure 445, the encryption/decryption card 22 of the first mobile device 5 figures out the session key exchange parameters $Y_A$ and $Y_B$ and then gets a session key $K_{ses}$. In the procedure 446, the encryption/decryption card 22 of the first mobile device 5 figures out an MAC value of the session key $K_{ses}$ to get a session key value $T_A$, wherein the $T_A$ is a value to authenticate the correctness of the session key so as to make it consistent with the session key generated by the encryption/decryption card 22 of the other side of the communication parties. There is another way to achieve this purpose, and the computation of the MAC value here is nothing but one approach. In the procedure 447, the secure communication application module 11 of the first mobile device 5 generates a key exchange authentication packet 4 containing $VID_A$, $VID_B$, $E_{AB}$, and $T_A$ and then transmits the key authentication packet 4 to the second mobile device 6 through a secret server (not shown).

Figure 9:
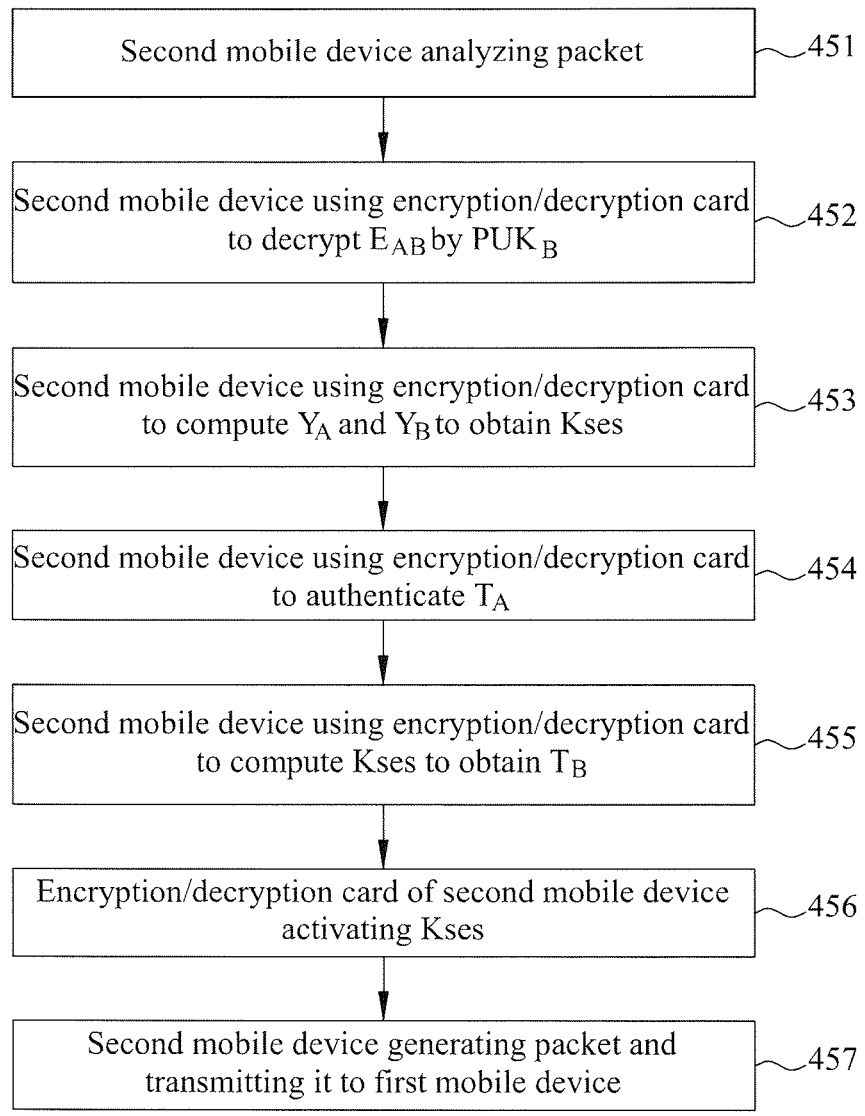
FIG. 9 is a flowchart illustrating the steps of activating the key by the second mobile device according to the first preferred embodiment of present invention.

Referring to FIG. 9, the fifth step 45 includes procedures 451-457. In the procedure 451, the secure communication application module 11 of the second mobile device 6 analyzes the key exchange authentication invitation packet 4 indicated in the procedure 447. In the procedure 452, the encryption/decryption card 22 of the second mobile device 6 decrypts the data $E_{AB}$ by the private key $PRK_B$. In the procedure 453, the encryption/decryption card 22 of the second mobile device 6 computes the session key exchange parameters $Y_A$ and $Y_B$ to obtain the session key $K_{ses}$. In the procedure 454, the second mobile device 6 uses the encryption/decryption card 22 thereof to authenticate the session key value $T_A$. In the procedure 455, the second mobile device 6 uses the encryption/decryption card 22 thereof to compute the MAC value of the session key $K_{Ses}$ and obtain the session key value $T_B$. In the procedure 456, the encryption/decryption card 22 of the second mobile device 6 activates the session key $K_{ses}$. In the procedure 457, the secure communication application module 11 of the second mobile device 6 generates a key exchange authentication packet 4 including $VID_A$, $VID_B$ and $T_B$ and then transmits the key exchange authentication packet 4 to the first mobile device 5 through a secret server (not shown).

Figure 10:
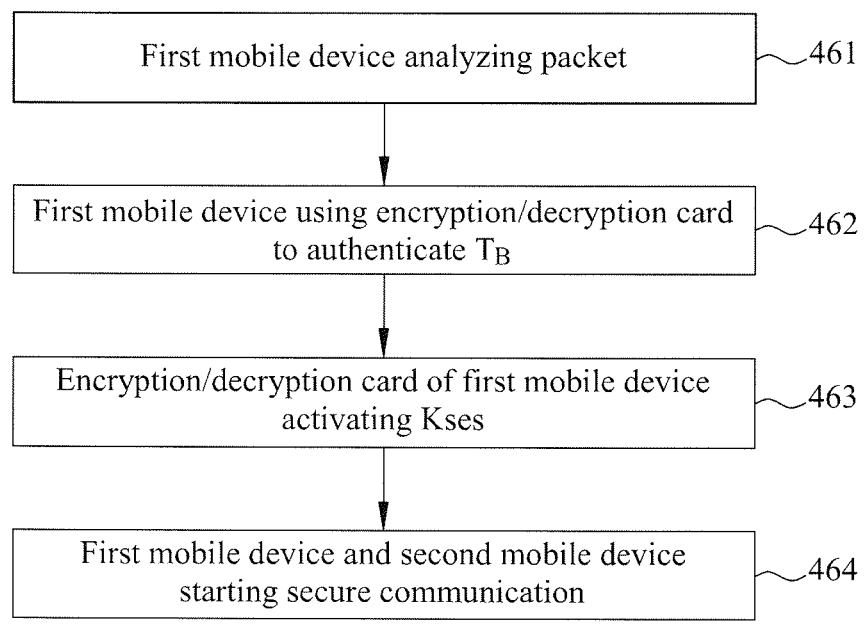
FIG. 10 is a flowchart illustrating the steps of activating the key by the first mobile device according to the first preferred embodiment of present invention.

Referring to FIG. 10, the sixth step 46 includes procedures 461-464. In the procedure 461, the secure communication application module 11 of the first mobile device 5 analyzes the key exchange authentication packet 4 indicated in the procedure 457. In the procedure 462, the encryption/decryption card 22 of the first mobile device 5 authenticates the MAC value $T_B$. In the procedure 463, the encryption/decryption card 22 of the first mobile device 5 executes the session key $K_{Ses}$ after the MAC value $T_B$ is authenticated correctly. In the procedure 464, the first mobile device 5 and the second mobile device 6 can start secure communication when the encryption/decryption cards 22 of the first mobile device 5 and the second mobile device 6 activate the session key $K_{ses}$, respectively.

Figure 11:
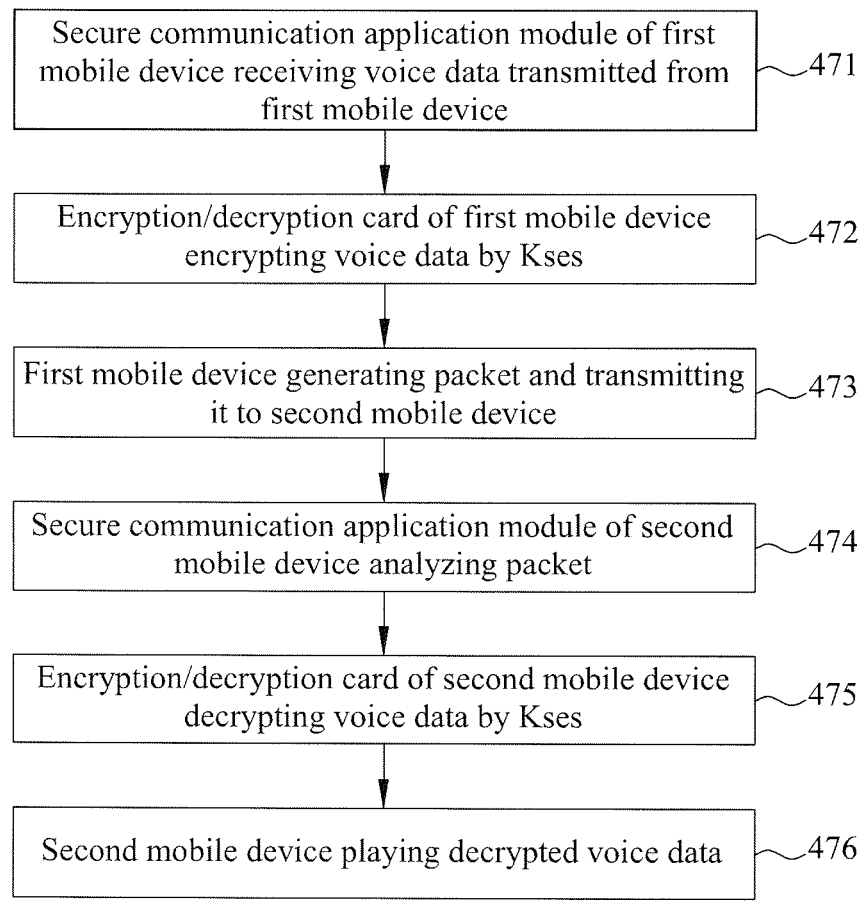
FIG. 11 is a flowchart, illustrating a step of secure voice communication according to the first preferred embodiment of present invention.

Referring to FIG. 11, the seventh step 47 includes procedures 471-476. In the procedure 471, the secure communication application module 11 of the first mobile device 5 receives the voice data transmitted from the first mobile device 5 and then encodes the voice data. In the procedure 472, the encryption/decryption card 22 of the first mobile device 5 encrypts the voice data by the session key $K_{ses}$. In the procedure 473, the secure communication application module 11 of the first mobile device 5 generates a voice data packet 4 containing $VID_A$ and $VID_B$ and encrypts the voice data and transmits the voice data packet 4 to the second mobile device 6 through a secret server (not shown). In the procedure 474, the secure communication application module 11 of the second mobile device 6 analyzes the voice data packet 4 indicated in the procedure 473. In the procedure 475, the encryption/decryption card 22 of the second mobile device 6 decrypts the voice data by the session key $K_{ses}$. In the procedure 476, the secure communication application module 11 of the second mobile device 6 decodes and plays the decrypted voice data on the second mobile device 6.

Figure 12:
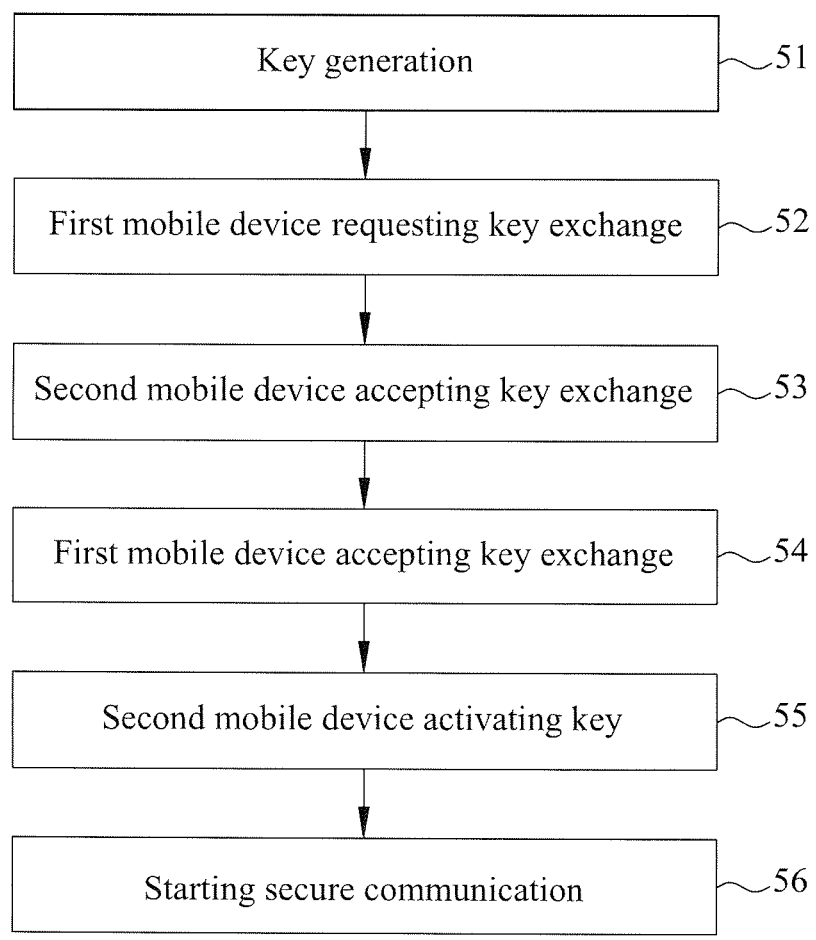
FIG. 12 is a flowchart illustrating the communication security method according to a second preferred embodiment of present invention.

The second preferred embodiment of the present invention can also provide an encryption/decryption transmitting method for voice data. In the second preferred embodiment of the present invention, secure communication can be started as long as the session key $K_{Ses}$ is activated in the mobile device of the receiving end. In this way, the time required for authentication of the CSP 3 can be saved. Referring to FIG. 12, the communication security method according to the second preferred embodiment of present invention includes the first step 51 of generating keys, the second step 52 of requesting a key exchange by a first mobile device, the third step 53 of receiving a key exchange by a second mobile device, the fourth step 54 of receiving a key exchange by a first mobile device, the fifth step 55 of activating the key by the second mobile device, and the sixth step 56 of starting secure communication. The second preferred embodiment of the present invention can start secure communication between the first mobile device 5 and the second mobile device 6 as long as the session key $K_{ses}$ is activated once.

Referring to FIG. 3 and FIG. 4 again, in the first step 51, the encryption/decryption cards 22 of the first mobile device 5 and the second mobile device 6 can generate a pair of CSP $3_A$ and CSP $3_B$ representing the first mobile device 5 and the second mobile device 6, respectively.

In the second step 52, the secure communication application module 11 of the first mobile device 5 can generate a packet 4 containing the CSP $3_A'$ representing the first mobile device 5 and transmit the packet 4 to the second mobile device 6. In the meantime, the CSP $3_A'$ can be a CT.

In the third step 53, the secure communication application module 11 of the second mobile device 6 receives and analyzes the packet 4 indicated in the second step 52 to get the CSP $3_A'$ representing the first mobile device 5. After that, the secure communication application module 11 of the second mobile device 6 can transmit the CSP $3_A'$ representing the first mobile device 5 to the encryption/decryption card 22 of the second mobile device 6 and authenticate the CSP $3_A'$ representing the first mobile device 5. After the authentication is correct, the encryption/decryption card 22 of the second mobile device 6 can obtain the CSP $3_B'$ by means of a key derivation function (KDF) (not shown), and the secure communication application module 11 of the second mobile device 6 can generate the packet 4 containing the CSP $3_B'$ and transmit the packet 4 to the first mobile device 5.

In the fourth step 54, the secure communication application module 11 of the first mobile device 5 receives and analyzes the packet 4 indicated in the third step 53 to get the CSP $3_B'$. After that, the secure communication application module 11 of the first mobile device 5 can transmit the CSP $3_B'$ to the encryption/decryption card 22 of the first mobile device 5 and authenticate the CSP $3_B'$. After the authentication is correct, the encryption/decryption card 22 of the first mobile device 5 can generate a CSP $3_A''$ and the secure communication application module 11 of the first mobile device 5 can generate the packet 4 containing the session key value and transmit the packet 4 to the second mobile device 6. In the meantime, the CSP $3_A''$ can be the session key 7 generated by the first mobile device 5, and the CSP $3_A''$ is a value encrypted by the CSP $3_B'$ of the second mobile device 6.

In the fifth step 55, the secure communication application module 11 of the second mobile device 6 receives and analyzes the packet 4 indicated in the fourth step 54 to get the CSP $3_A''$. After that, the secure communication application module of the second mobile device 6 can transmit the CSP $3_A''$ to the encryption/decryption card 22 of the second mobile device 6 and authenticate the session key 7. After the authentication is correct, the encryption/decryption card 22 of the second mobile device 6 can activate the session key 7. Finally, the first mobile device 5 and the second mobile device 6 can start secure communication when the second mobile device 6 activates the session key 7.

In the sixth step 56, the secure communication application module 11 of the first mobile device 5 can obtain the voice data transmitted from the first mobile device 5. After that, the first mobile device 5 can use the encryption/decryption card 22 thereof to encrypt the voice data by the session key 7. Next, the secure communication application module 11 of the first mobile device 5 can generate the packet 4 containing the session key 7 and the voice data and transmit the packet 4 to the second mobile device 6. The second mobile device 6 can use the session key 7 of the encryption/decryption card 22 of the second mobile device 6 to decrypt the voice data when the second mobile device 6 receives the packet 4. The second mobile device 6 can play the voice data transmitted from the first mobile device 5 after the encryption/decryption card 22 of the second mobile device 6 completes decryption.

Figure 13:
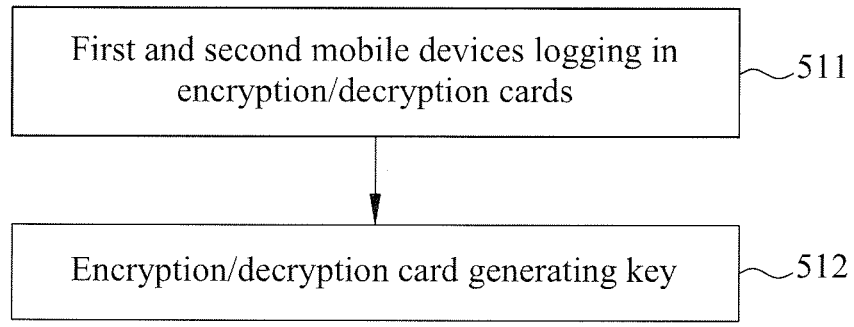
FIG. 13 is a flowchart illustrating the steps of generating keys according to the second preferred embodiment of present invention.

The detailed procedures of every step of the second preferred embodiment will now be described hereinafter. Referring to FIG. 13, the fifth step 51 includes procedures 511-512. The procedures 511-512 are identical to the procedures 411-412 of the first preferred embodiment of present invention, so further recitation is skipped.

Figure 14:
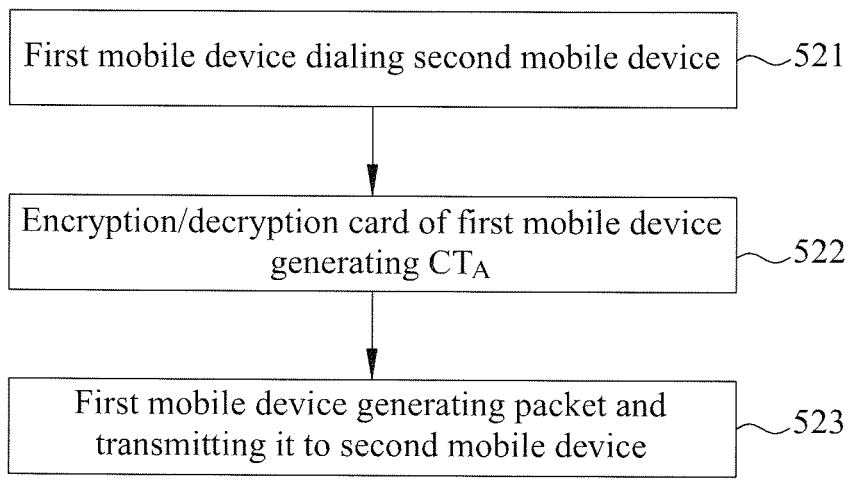
FIG. 14 is a flowchart illustrating the steps of requesting a key exchange from the first mobile device according to the second preferred embodiment of present invention.

Referring to FIG. 14, the second step 52 includes procedures 521-523. The procedures 521-523 are identical to the procedures 421-423 of the first preferred embodiment of present invention, so further recitation is skipped.

Figure 15:
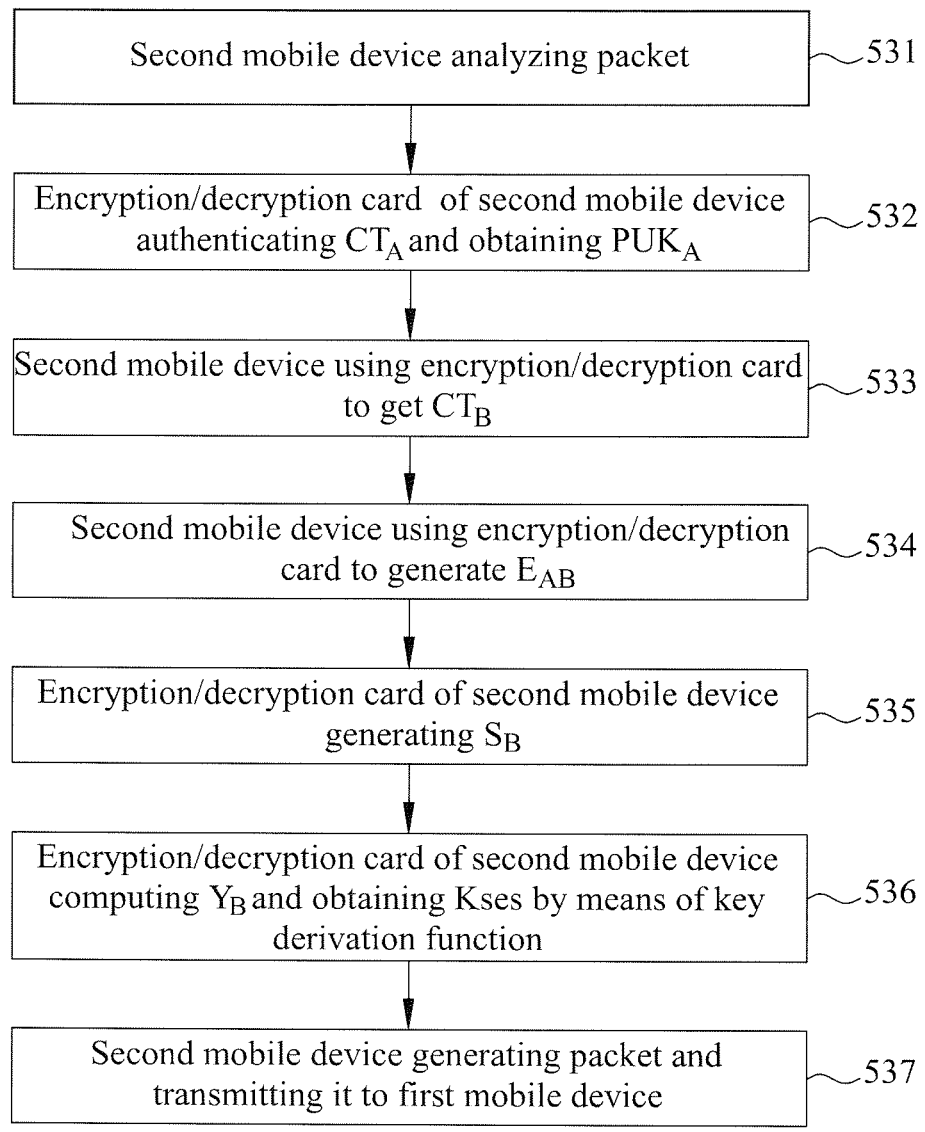
FIG. 15 is a flowchart illustrating the steps of receiving the request for the key exchange by the second mobile device according to the second preferred embodiment of present invention.

Referring to FIG. 15, the third step 53 includes procedures 531-537, wherein the procedures 531-534 are identical to the procedures 431-434 of the first preferred embodiment of present invention, so further recitation is skipped. In the procedure 535, the encryption/decryption card 22 of the second mobile device 6 generates data $S_B$. In the procedure 536, the encryption/decryption card 22 of the second mobile device 6 computes a session key exchange parameter $Y_B$ and obtains a session key $K_{ses}$ by means of a key derivation function (KDF). In the procedure 537, the secure communication application module 11 of the second mobile device 6 can generate a packet 4 containing $E_{AB}$, $S_B$, $CT_B$, $VID_A$, $VID_B$, and $PUK_B$ and then transmit the packet 4 to the first mobile device 5 through a secret server (not shown).

Figure 16:
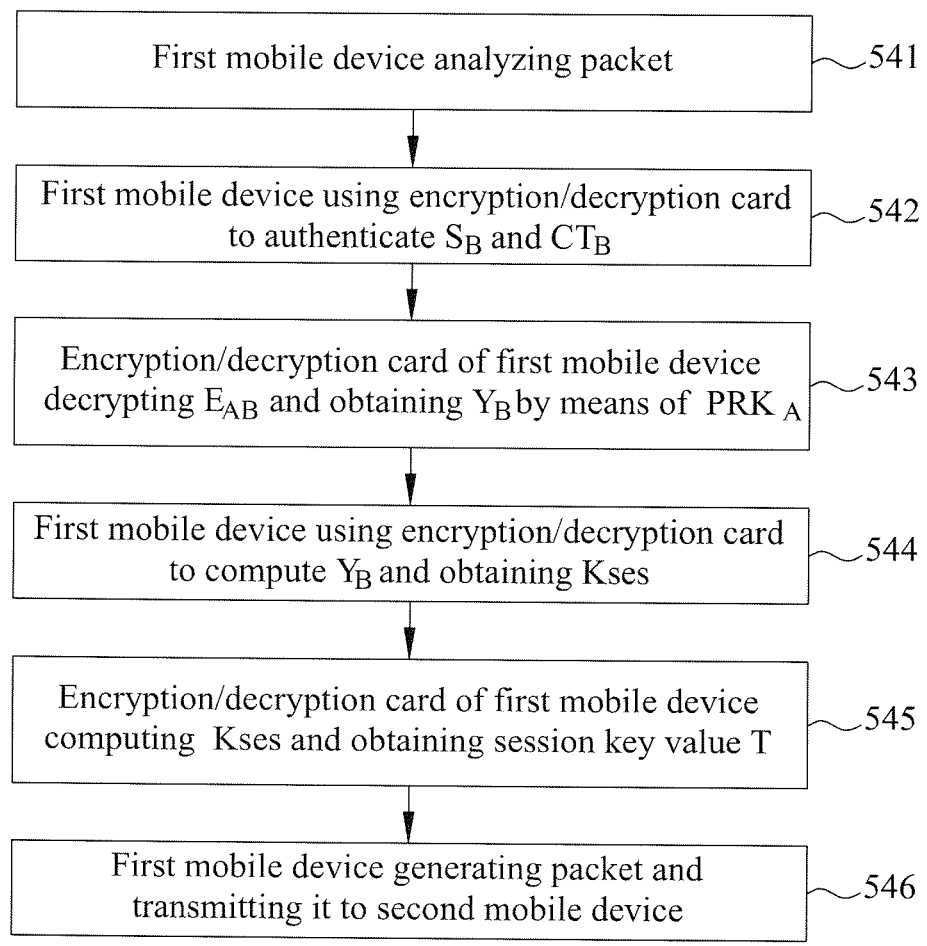
FIG. 16 is a flowchart illustrating the steps of receiving the request for the key exchange by the first mobile device according to the second preferred embodiment of present invention.

Referring to FIG. 16, the fourth step 54 includes procedures 541-546. In the procedure 541, the secure communication application module 11 of the first mobile device 5 analyzes the packet 4 indicated in the procedure 537. In the procedure 542, the first mobile device 5 checks and verifies the data $S_B$ and the calling token $CT_B$ via the encryption/decryption card 22 of the first mobile device 5. In the procedure 543, the encryption/decryption card 22 of the first mobile device 5 decrypts the data $E_{AB}$ and obtains the session key exchange parameter $Y_B$ by means of the private key $PRK_A$. In the procedure 544, the first mobile device 5 uses the encryption/decryption card 22 thereof to compute the session key exchange parameter $Y_B$ and obtains the session key $K_{Ses}$. In the procedure 545, the encryption/decryption card 22 of the first mobile device 5 computes the MAC value of the session key $K_{ses}$ and obtains a session key value T, which can authenticate the correctness of the session key so as to make it consistent with the session key generated by the encryption/decryption card 22 of the other side of the communication parties. There is another way to achieve this purpose, and the MAC value computed here is nothing but one approach. In the procedure 546, the secure communication application module 11 of the first mobile device 5 can generate a key exchange authentication packet 4 containing $VID_A$, $VID_B$, and T and then transmit the key exchange authentication packet 4 to the second mobile device 6 through a secret server (not shown).

Figure 17:
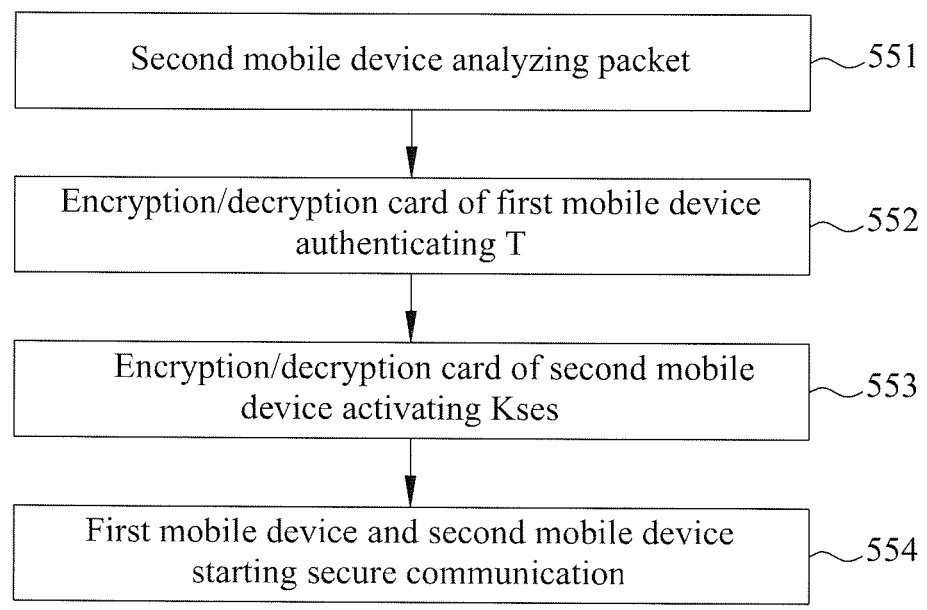
FIG. 17 is a flowchart illustrating the steps of activating the key by the second mobile device according to the second preferred embodiment of present invention.

Referring to FIG. 17, the fifth step 55 includes procedures 551-554. In the procedure 551, the secure communication application module 11 of the second mobile device 6 analyzes the key exchange authentication packet 4 indicated in the procedure 546. In the procedure 552, the encryption/decryption card 22 of the second mobile device 6 authenticates the session key value T. In the procedure 553, the encryption/decryption card 22 of the second mobile device 6 activates the session key $K_{ses}$ after the encryption/decryption card 22 of the second mobile device 6 authenticates the session key value T correctly. In the procedure 554, the first mobile device 5 and the second mobile device 6 can start secure communication.

Figure 18:
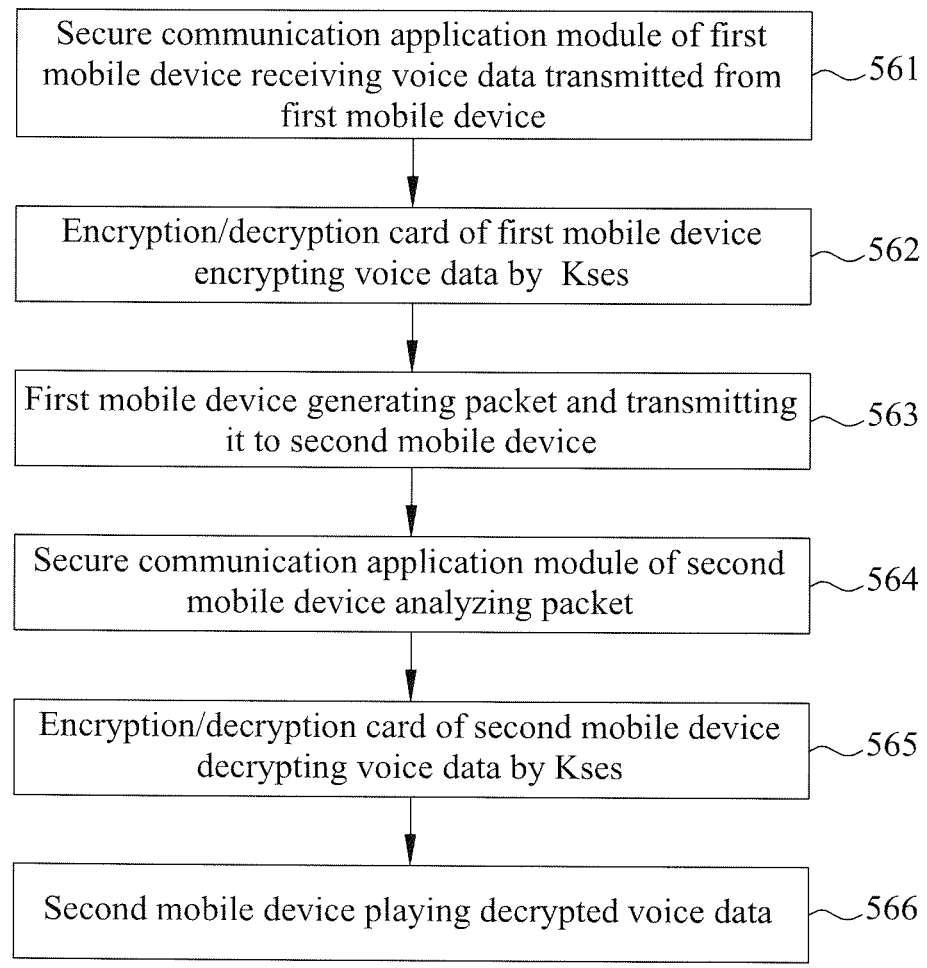
FIG. 18 is a flowchart illustrating the steps of the secure voice communication according to the second preferred embodiment of present invention.

Referring to FIG. 18, the sixth step 56 includes procedures 561-566. The procedures 561-566 are identical to the procedures 471-476 of the first preferred embodiment.

After the processing of the secure communication method of the first preferred embodiment and the second preferred embodiment, the encryption/decryption transmitting of the voice data can be done, wherein the voice data of the first mobile device 5 and the second mobile device 6 are encrypted by the CSP 3 with advanced encryption standard (AES-256). The encryption and decryption are performed in the encryption/decryption cards 22 of the first mobile device 5 and the second mobile device 6. In the first preferred embodiment and second preferred embodiment, none of any CSP 3 is stored or computed in the secure communication application modules 11 of the first mobile device 5 and the second mobile device 6. The encryption and decryption CSP 3 for the voice data in at least one of the first mobile device 5 and the second mobile device 6 are random and different. The transmitted packet 4 will arrive at the secret server. The secret server will locate the IP address of a mobile device according to voice VID carried in the packet 4 and then perform the transmission. It can be seen from the whole process that each of the secure communication application modules 11 of the first mobile device 5 and the second mobile device 6 is responsible for transmission and combination of data. The various encryption and decryption are computed by the encryption/decryption cards 22. In particular, the voice packet (not shown) in the final step is also transmitted to the encryption/decryption cards 22 via the secure communication application modules 11 for encryption and decryption. The secret server is just to help the transmission of the packet 4 without any encryption and decryption.

Figure 19:
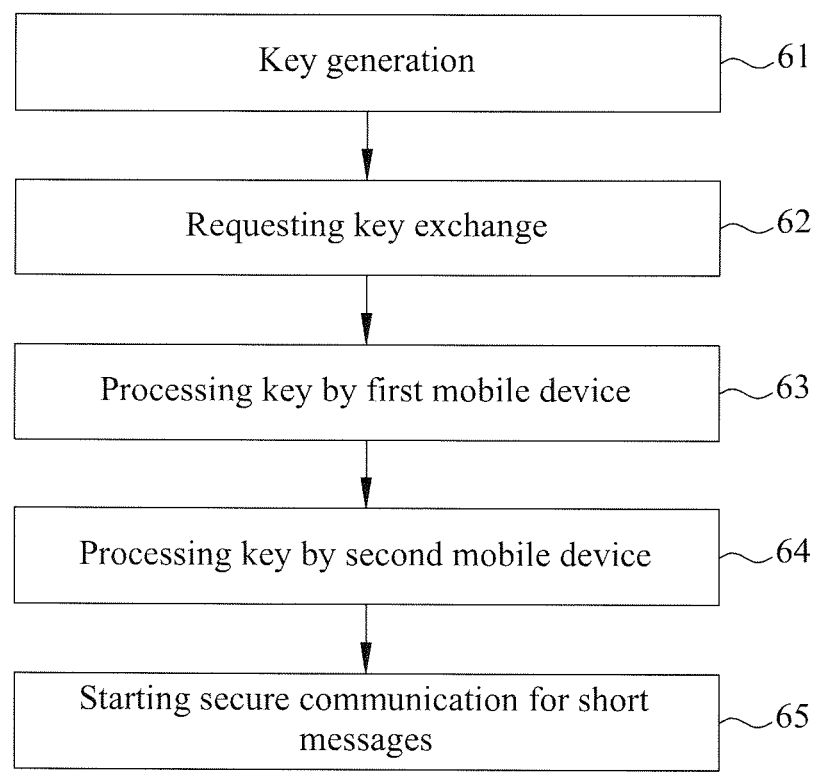
FIG. 19 is a flowchart illustrating the secure communication method for short messages according to a third preferred embodiment of present invention.

A third preferred embodiment of the present invention can provide a secure communication method for short messages. Referring to FIG. 19, the secure communication method for the messages includes the first step 61 of generating keys, the second step 62 of requesting key exchange, the third step 63 of processing the key by the first mobile device, the fourth step 64 of processing the key by the second mobile device, and the fifth step 65 of starting secure communication for short messages.

In the first step 61, the encryption/decryption cards 22 of the first mobile device 5 and the second mobile device 6 can generate a pair of CSPs 3 representing the first mobile device 5 and the second mobile device 6, respectively.

In the second step 62, the secure communication application module 11 of the first mobile device 5 can transmit the CSP 3 representing the first mobile device 5 to the second mobile device 6 for requesting key exchange. After that, the encryption/decryption card 22 of the second mobile device 6 generates a session key $K_{ses}$ and transmits the session key $K_{ses}$ back to the first mobile device 5.

In the third step 63, the encryption/decryption card 22 of the first mobile device 5 can obtain a short message system (SMS) CSP 3 from the CSP 3. After that, the encryption/decryption card 22 of the first mobile device 5 stores the SMS CSP 3 to flash memory 222 of the encryption/decryption card 22 of the first mobile device 5.

In the fourth step 64, the encryption/decryption card 22 of the second mobile device 6 can obtain the SMS CSP 3 form the CSP 3. After that, the encryption/decryption card 22 of the second mobile device 6 stores the SMS CSP 3 to the flash memory 222 of the encryption/decryption card 22 of the second mobile device 6.

In the fifth step 65, the encryption/decryption card 22 of the first mobile device 5 can encrypt the short messages (not shown) going to be transmitted by the first mobile device 5 by means of the SMS CSP 3. After that, the secure communication application module 11 of the first mobile device 5 transmits the encrypted short message to the second mobile device 6. Next, the second mobile device 6 uses the encryption/decryption card 22 of the second mobile device 6 to decrypt the encrypted short message.

Figure 20:
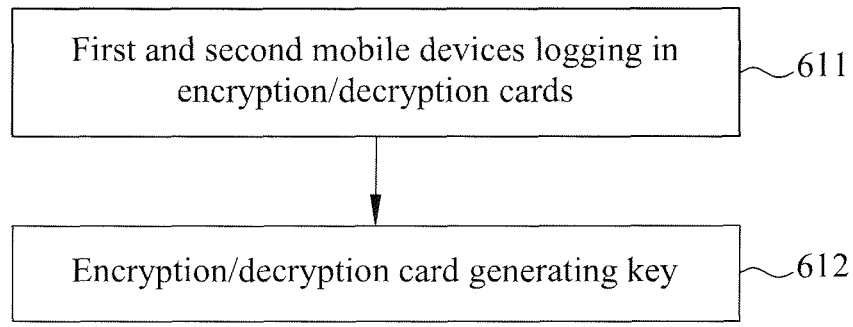
FIG. 20 is a flowchart illustrating the steps of generating keys according to the third preferred embodiment of present invention.

The detailed procedures of every step of the third preferred embodiment will now be described hereinafter. Referring to FIG. 20, the key generating step 61 includes procedures 611-612. In the procedure 611, before the secure communication for short messages takes place between the first mobile device 5 and the second mobile device 6 for the first time, the first mobile device 5 and the second mobile device 6 have to sign in the encryption/decryption cards 22 via the secure communication application modules 11, respectively. In the procedure 612, after the first mobile device 5 and the second mobile device 6 sign in the encryption/decryption cards 22 via the secure communication application modules 11, respectively, the first mobile device 5 and the second mobile device 6 can generate a pair of RSA keys via the encryption/decryption cards 22 installed in the first mobile device 5 and the second mobile device 6, respectively. The CSP $3_A$ generated by the first mobile device 5 includes a public key $PUK_A$ and a private key $PRK_A$ and the CSP $3_B$ generated by the second mobile device 6 includes a public key $PUK_B$ and a private key $PRK_B$. These pairs of the keys will not be exposed externally. After the first step 61, the first mobile device 5 and the second mobile device 6 can perform the second step 62.

Figure 21:
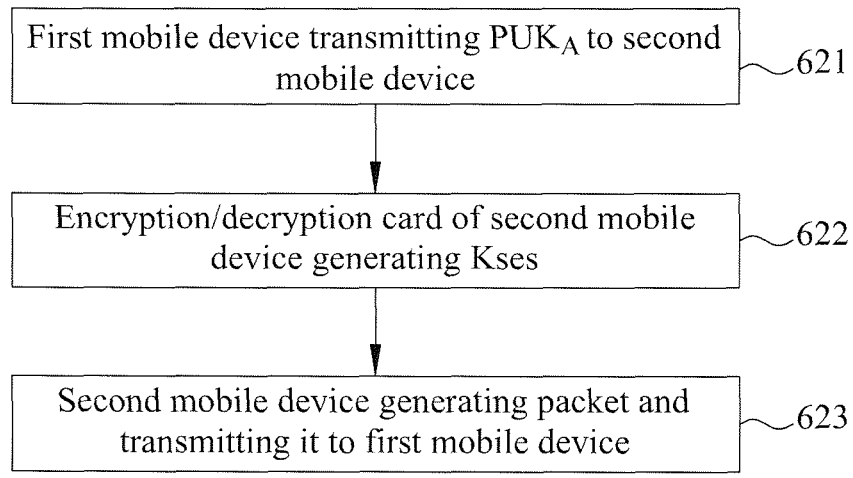
FIG. 21 is a flowchart illustrating the steps of requesting a key exchange according to the third preferred embodiment of present invention.

Referring to FIG. 21, the second step 62 includes procedures 621-623. In the procedure 621, the secure communication application module 11 of the first mobile device 5 transmits the public key $PUK_A$ to the encryption/decryption card 22 of the second mobile device 6. In the procedure 622, the encryption/decryption card 22 of the second mobile device 6 can receive the public key $PUK_A$ and authenticate the correctness of the public key $PUK_A$. The encryption/decryption card 22 of the second mobile device 6 can generate a session key $K_{ses}$ randomly after authenticating the $PUK_A$ correctly. In the procedure 623, the secure communication application module 11 of the second mobile device 6 generates a packet 4 containing the public key $PUK_A$ and the CSP 3 and then transmits the packet 4 to the first mobile device 5.

Figure 22:
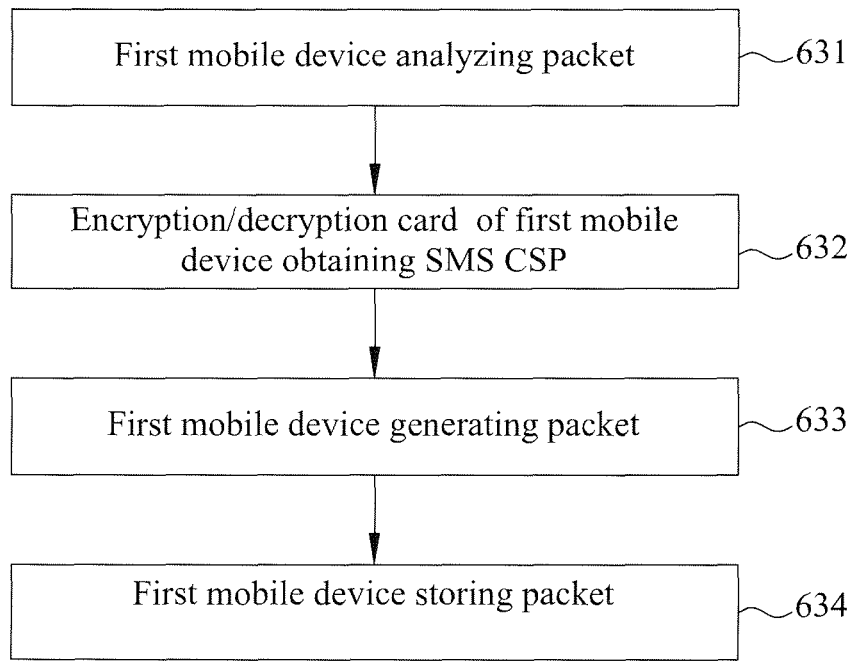
FIG. 22 is a flowchart illustrating the steps of processing of the key of the first mobile device according to the third preferred embodiment of present invention.

Referring to FIG. 22, the third step 63 includes procedures 631-634. In the procedure 631, the secure communication application module 11 of the first mobile device 5 can analyze the packet 4 indicated in the procedure 623 and obtains the session key $K_{ses}$. In the procedure 632, the encryption/decryption card 22 of the first mobile device 5 can obtain the SMS CSP 3 from the session key $K_{ses}$. In the procedure 633, the secure communication application module 11 of the first mobile device 5 can make the SMS CSP 3 become a packet 4 by means of the public key $PUK_A$. In the procedure 634, the secure communication application module 11 of the first mobile device 5 stores the packet 4 indicated in the procedure 633 into the flash memory 222 of the encryption/decryption card 22 of the first mobile device 5.

Figure 23:
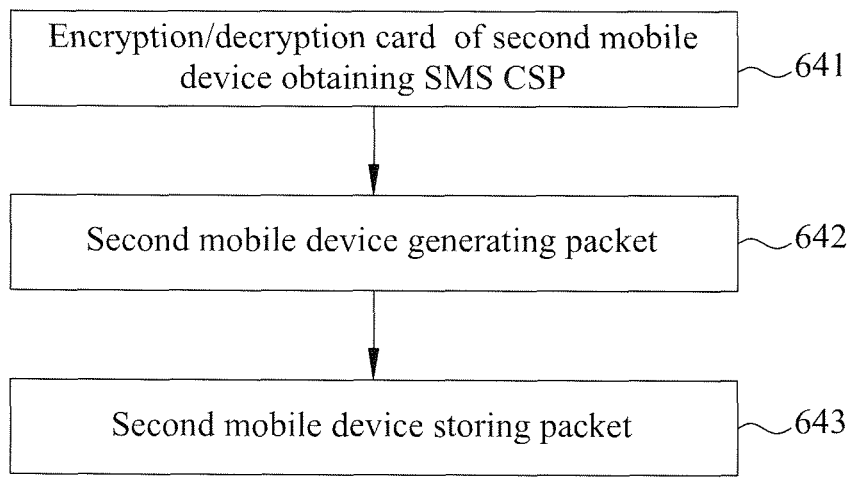
FIG. 23 is a flowchart illustrating the steps of processing of the key of the second mobile device according to the third preferred embodiment of present invention.

Referring to FIG. 23, the fourth step 64 includes procedures 641-643. In the procedure 641, the secure communication application module 11 of the second mobile device 6 can obtain the SMS CSP 3 form the session key $K_{ses}$. In the procedure 642, the secure communication application module 11 of the second mobile device 6 can make the SMS CSP 3 become a packet 4 by means of the public key $PUK_B$. In the procedure 643, the secure communication application module 11 of the second mobile device 6 stores the packet 4 indicated in the procedure 642 into the flash memory 222 of the encryption/decryption card 22 of the second mobile device 6.

Figure 24:
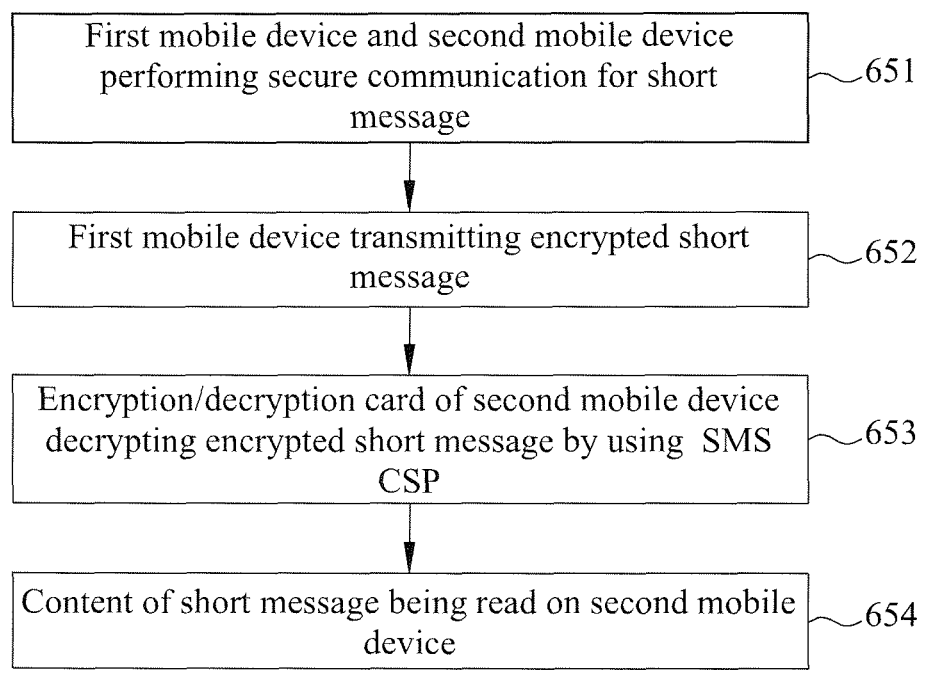
FIG. 24 is a flowchart illustrating the steps of the communication security method for the short messages according to the third preferred embodiment of present invention.

Referring to FIG. 24, the fifth step 65 includes procedures 651-654. In the procedure 651, the secure communication application modules 11 of the first mobile device 5 and the second mobile device 6 jointly perform the secure communication for the short message. In the procedure 652, the encryption/decryption card 22 of the first mobile device 5 encrypts the short message going to be transmitted by means of the SMS CSP 3. Next, the secure communication application module 11 of the first mobile device 5 transmits the encrypted short message to the second mobile device 6. In the procedure 653, the encryption/decryption card 22 of the second mobile device 6 decrypts the encrypted short message by using the SMS CSP 3. In the procedure 654, the content of the short message can be read on the second mobile device 6

After the secure communication method for the short messages is carried out, the transmission of the encrypted/decrypted short messages can be done, wherein short messages of the first mobile device 5 and the second mobile device 6 are encrypted by the SMS CSP 3 with AES-256. The encryption and decryption are performed in the encryption/decryption cards 22 of the first mobile device 5 and the second mobile device 6, respectively. In the operation of the secure communication method for the short messages, none of any CSP 3 is stored or computed in the secure communication application modules 11 of the first mobile device 5 and the second mobile device 6. The encryption and decryption CSP 3 for the short message in at least one of the first mobile device 5 and the second mobile device 6 are random and different. It can be seen by the whole process that the secure communication application modules 11 of the first mobile device 5 and the second mobile device 6 are responsible for transmission and combination of the data. The various encryption and decryption are performed by the encryption/decryption card 22.

Figure 25:
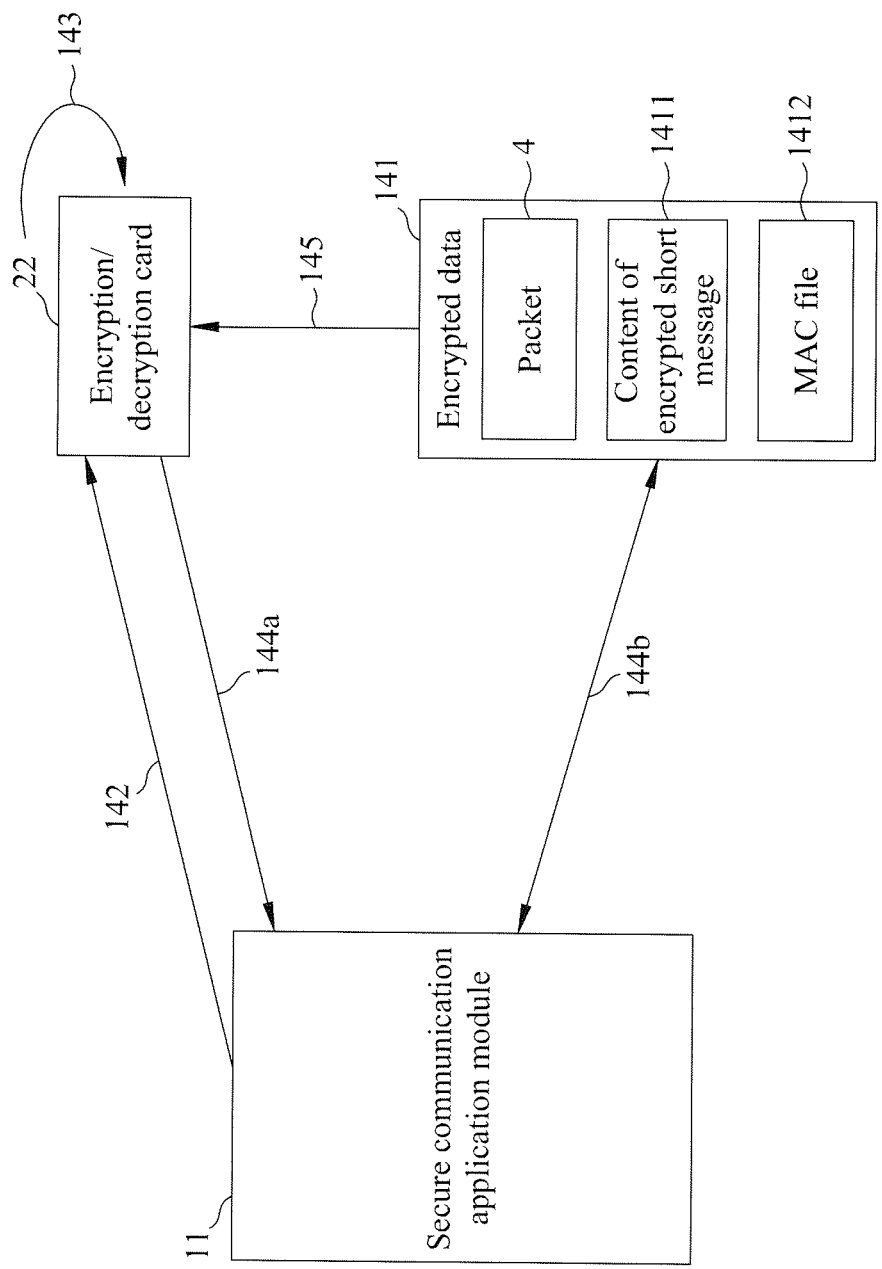
FIG. 25 is a block diagram illustrating the steps of internal transmission operations of a mobile device to which the communication security method for the short messages is applied to according to the third preferred embodiment of present invention.

Referring to FIG. 25, the secure communication application modules 11 of the first mobile device 5 and the second mobile device 6, the encryption/decryption card 22, encrypted data 141, and procedures 142-145 are shown. The encrypted data 141 further include the session key packet 4, content of an encrypted short message 1411, and an MAC file 1412. The procedure 142 is to establish a secure channel between the secure communication application module 11 and the encryption/decryption card 22. The procedure 143 is to generate a session key and a session key packet by an RSA public key. The procedure 144a is to transmit the session key and the session key packet back to the secure communication application module 11. The procedure 144b is to encrypt the content of the short message by means of the SMS CSP 3 to generate code of the MAC file and establish an encrypted file. The procedure 145 is to store the encrypted data 141 into the flash memory 222 of the encryption/decryption card 22.

The above exemplary embodiments describe the principle and effect of the present invention, but are not limited to the present invention. It will be apparent to those skilled in the art that various modifications and variations can be made to the disclosed embodiments. It is intended that the specification and examples be considered as exemplary only, with a true scope of the disclosure being indicated by the following claims and their equivalents.

Although the present invention has been described with reference to the preferred exemplary embodiments thereof, it is apparent to those skilled in the art that a variety of modifications and changes can be made without departing from the scope of the present invention which is intended to be defined by the appended claims.

What is claimed is:

1. A communication security method for a mobile device, comprising steps of:

generating a first key from a first mobile device and generating a second key from a second mobile device;

requesting a key exchange from the first mobile device;

receiving the request for the key exchange from the second mobile device and informing the first mobile device that the key exchange is received by the second mobile device;

generating a session key from the first mobile device and the second mobile device; and starting communication between the first mobile device and the second mobile device;

wherein encryptions/decryptions of the first key, the second key, and the session key are performed in a first encryption/decryption card of the first mobile device and a second encryption/decryption card of the second mobile device, wherein the second step further comprises sub-steps of:

calling the second mobile device from the first mobile device;

transmitting the first key of the first mobile device to the second mobile device;

receiving the first key and authenticating the first key by the second mobile device;

transmitting the second key of the second mobile device to the first mobile device after the second mobile device authenticates the first key successfully; and receiving the second key and authenticating the second key by the first mobile device, wherein after the first key is authenticated by the second mobile device successfully and the second key is authenticated by the first mobile device successfully, the first encryption/decryption card of the first mobile device and the second encryption/decryption card of the second mobile device jointly generate the session key, and wherein the second step further comprises sub-steps of:

transmitting the session key from the second mobile device to the first mobile device and activating the session key by the second mobile device; and receiving the session key from the first mobile device and authenticating whether the session key of the second mobile device is consistent with the session key of the first mobile device.

2. The communication security method according to claim 1, wherein the first step further comprises sub-steps of:

signing in the first encryption/decryption card by means of a first secure communication application module from the first mobile device; and signing in the second encryption/decryption card by means of a second secure communication application module from the second mobile device.

3. The communication security method according to claim 1, wherein the authentications of the first key and the second key are performed in the encryption/decryption cards of the first mobile device and the second mobile device, respectively.

4. The communication security method according to claim 1, wherein the last step further comprises sub-steps of:

transmitting data of the communication and the session key from the first mobile device to the second mobile device;

authenticating the session key by the second mobile device; and playing the data of the communication on the second mobile device after the second mobile device authenticates the session keys successfully;

wherein the authentication of the session key is performed by the second encryption/decryption card of the second mobile device.

5. The communication security method according to claim 4, wherein the data of the communication are voice data or short messages.

\* \* \* \* \*